United States Patent [19]

Kullendorff et al.

[11] 4,299,087
[45] Nov. 10, 1981

[54] GAS TURBINE PLANT WITH FLUIDIZED BED COMBUSTOR

[75] Inventors: Anders Kullendorff, Aby; Tonu Vahtra, Norrkoping, both of Sweden

[73] Assignee: Stal-Laval Turbin AB, Sweden

[21] Appl. No.: 26,259

[22] Filed: Apr. 2, 1979

[30] Foreign Application Priority Data

Apr. 11, 1978 [SE] Sweden .............................. 7804023

[51] Int. Cl.³ .......................... F02C 3/26; F02C 7/268
[52] U.S. Cl. .......................... 60/39.14 M; 60/39.46 S
[58] Field of Search ................ 60/39.14 R, 39.14 M, 60/39.46 S; 431/7, 170; 122/41 D

[56] References Cited

U.S. PATENT DOCUMENTS

| | | | |
|---|---|---|---|
| 1,854,615 | 4/1932 | Lasley | 60/39.14 M |
| 2,262,195 | 11/1941 | Noack | 60/39.14 R |
| 2,465,464 | 3/1949 | Meyer | 60/39.46 R |
| 2,667,742 | 2/1954 | Kuzmitz | 60/39.14 R |
| 2,822,665 | 2/1958 | Nicolin | 60/39.14 M |
| 3,791,137 | 2/1974 | Jubb et al. | 122/4 D |
| 3,914,089 | 10/1975 | Desty | |
| 4,019,316 | 4/1977 | Pfefferle | 431/7 |
| 4,039,272 | 8/1977 | Elliott | 431/7 |
| 4,096,909 | 6/1978 | Jukkola | 122/4 D |
| 4,161,102 | 7/1979 | Jasas et al. | 60/39.14 M |
| 4,171,945 | 10/1979 | Lazenby | 431/7 |

Primary Examiner—Louis J. Casaregola
Attorney, Agent, or Firm—Pollock, Vande Sande & Priddy

[57] ABSTRACT

A gas turbine plant having a gas turbine and an associated compressor that is operated to produce compressed air. The compressed air is applied to support the combustion of an ignited fluidized bed of combustible material disposed within a main combustion chamber. Combustion gases from the fluidized bed are applied to drive the turbine and the compressor. Auxiliary heating chambers are employed to heat the combustible material of the fluidized bed to an ignition temperature over a turbine start-up interval. An ignition combustion chamber is connected in parallel with the fluidized bed and is operated during the turbine start-up interval to apply its combustion gases to drive the unloaded or lightly loaded turbine and compressor.

2 Claims, 2 Drawing Figures

GAS TURBINE PLANT WITH FLUIDIZED BED COMBUSTOR

BACKGROUND OF THE INVENTION

The invention relates to means for starting a gas turbine plant, and, more particularly, to such a starting means that includes an ignition combustion chamber connected in parallel with a main combustion chamber to drive a turbine of the turbine plant during a turbine start-up interval when a fluidized bed of combustible material in the main combustion chamber is being heated to an ignition temperature.

It is known to apply the combustion gases of an ignited, fluidized bed of combustible material to drive a turbine and associated compressor of a turbine plant. However, in order to start such a turbine plant in operation, it is necessary to utilize an auxiliary heating apparatus for initially heating the combustible material of the fluidized bed to an ignition temperature over a start-up interval. Likewise, auxiliary driving apparatus must be employed to operate the turbine and the compressor so that compressed air may be applied to support the combustion of at least the fluidized bed during the start-up interval. Such auxiliary driving apparatus may include an auxiliary motor for operating the turbine during the start-up interval or an injector apparatus for blowing high pressure air from an air receiver into the compressor of the turbine to operate the compressor and the turbine.

Prior art systems for starting gas turbines have the disadvantage that the associated auxiliary driving apparatus must be relatively powerful in order to drive the turbine and compressor during the substantial interval when the combustible fuel in the main combustion chamber is being heated to its ignition temperature. Thus, such driving apparatus tends to be relatively large and expensive, even if the amount of fluidized combustible fuel in the main combustion chamber is reduced during the turbine start-up interval and the duration of the start-up interval and driving power requirements for the turbine and compressor are thereby reduced. Moreover, for reasons of practical economy, it is generally not feasible to utilize ignition start-up apparatus having sufficient power to drive even a lightly loaded turbine during the start-up interval.

Accordingly, it is an object of the invention to provide a simple and efficient means for operating a turbine and an associated compressor in a gas turbine plant under no load or light load conditions, while the combustible material in a fluidized bed in a main combustion chamber is being heated to an ignition temperature.

A further object of the invention is to provide such a turbine start-up means that may operate to drive a turbine and associated compressor during the start-up interval without requiring a reduced amount of combustible material in the fluidized bed of the main combustion chamber.

These and other objects of the invention will become apparent from a review of the detailed specification which follows and a consideration of the accompanying drawings.

BRIEF SUMMARY OF THE INVENTION

In order to achieve the objects of the invention and to overcome the problems of the prior art, the improved gas turbine starting apparatus, according to the invention, includes an ignition combustion chamber that is connected in parallel with a fluidized bed of combustible material in a main combustion chamber. The ignition combustion chamber provides combustion gases for driving a turbine and an associated compressor during a turbine start-up interval when combustible material in a fluidized combustion bed in the main combustion chamber is being heated to an ignition temperature.

The turbine and compressor are initially started for a brief interval by an auxiliary device such as a motor or an air injector so that compressed air may be supplied to at least the ignition combustion chamber. Thereafter, liquid or gaseous ignition fuel is ignited in the ignition combustion chamber and the resultant combustion gases are applied to drive the turbine and associated compressor. The auxiliary starting apparatus may be turned off immediately after the ignition combustion chamber has operated to begin driving the turbine and the compressor.

When the turbine and compressor are being driven by the combustion gases of the ignition combustion chamber, compressed air from the compressor may also be applied to auxiliary heating units that are employed to heat the combustible material in the fluidized bed of the main combustion chamber to an ignition temperature.

DETAILED DESCRIPTION OF PREFERRED EMBODIMENTS

Figure 1:
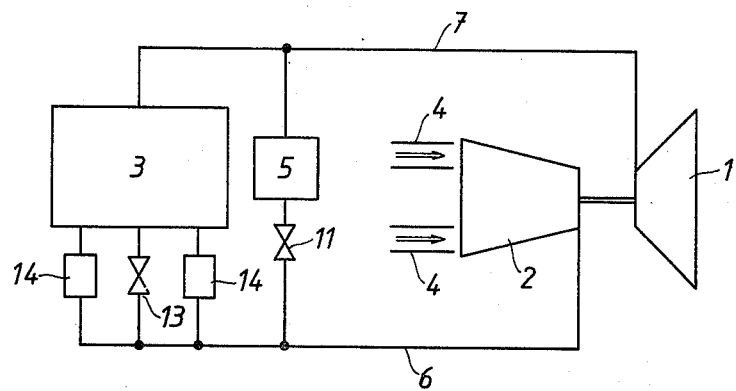
FIG. 1 shows a block diagram of a gas turbine plant with a turbine starting apparatus according to the invention.

The remaining portion of this specification will describe preferred embodiments of the invention when read in conjunction with the attached drawings, in which like reference characters identify identical apparatus.

FIG. 1 shows a block diagram of a gas turbine plant comprising a gas turbine 1 that drives a compressor 2. The plant is provided with a combustion chamber 3 having a fluidized bed of combustible fuel. In order to start the plant without first heating the fluidized bed, a special ignition combustion chamber 5 is connected in parallel with the main combustion chamber 3.

In operation, the turbine 1 may be started by a motor or, as shown, by an injector device 4, that blows high pressure air from an air receiver into the compressor to cause the compressor to rotate. The compressed air that is produced by the compressor is passed by a conduit 6, through an associated valve 11, to the ignition combustion chamber 5. Combustible ignition fuel is also supplied to the ignition combustion chamber and is ignited in the chamber to generate combustion gases that are passed to the turbine over a conduit 7 to drive the turbine in an unloaded condition. Of course, if the ignition combustion chamber is sufficiently large, the turbine may be driven under a light load. As the fuel in the combustion chamber is ignited, auxiliary heating devices are employed to heat the fluidized bed to an ignition temperature.

Figure 2:
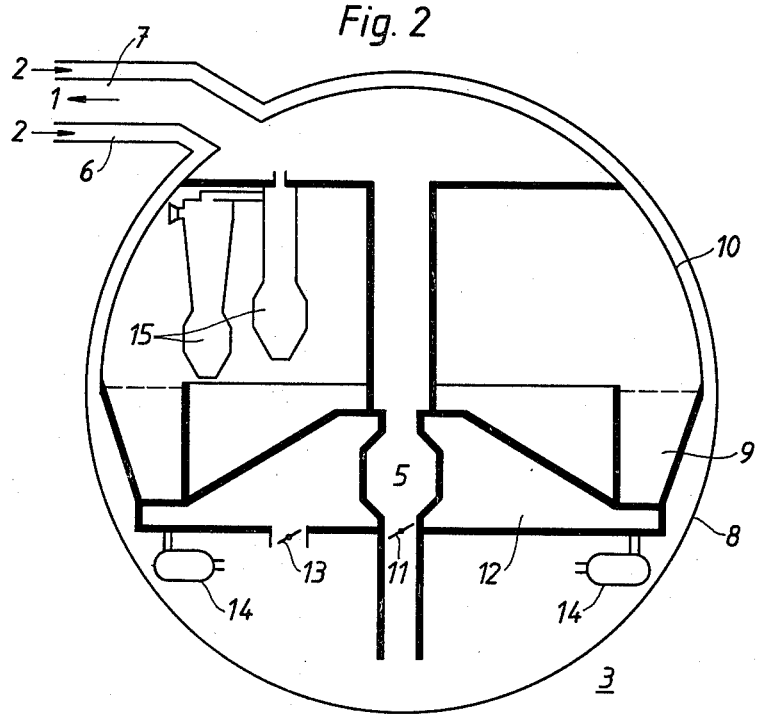
FIG. 2 shows a diagrammatic representation of an apparatus for powering a turbine and associated compressor in accordance with the invention.

FIG. 2 shows a more detailed illustration of the combustion chamber 3 of the invention. In operation, the compressed air from the compressor enters through outer tube 6 and the hot gases from combustion in either the ignition combustion chamber 5 or the fluidized bed are passed to the turbine 1 through an inner tube 7 disposed within the outer tube 6.

The combustion chamber 3 includes a spherical, pressure-absorbing outer casing 8 having an inner fluidized bed 9 that is annular in shape. The incoming compressed air from the conduit 6 passes into the volume between the outer casing 8 and an inner casing 10 that forms a roof above the fluidized bed 9. The incoming compressed air is passed down to the bottom of the combustion chamber and is distributed to different parts of the combustion chamber to support combustion.

The ignition combustion chamber 5 is provided with a regulating and cut-off valve 11 to control the flow of compressed air. Below the fluidized bed is positioned a distribution box 12 for directing the incoming compressed air to the fluidized bed. The distribution box receives incoming air through at least one regulating and cut-off valve 13 or through auxiliary combustion chambers 14 that are employed to heat the fluidized bed.

The auxiliary combustion chambers 14 receive combustible ignition fuel during the plant start-up period and the ignition fuel is ignited to heat compressed air that is passed to the auxiliary combustion chambers, for example by regulating and cut-off valves (not shown). The heated air from the combustion chambers is passed to the fluidized bed to heat combustible material, for example crushed carbon, in the bed to an ignition temperature. It should be understood that while the auxiliary combustion chambers 14 are heating the fluidized bed, the ignition combustion chamber 5 is operating to drive the compressor and unloaded or lightly loaded turbine.

Two-stage cyclones 15 are positioned above the fluidized bed 9 to receive the hot combustion gases and associated particulate combustion material, for example ashes, and to filter the particulate material from the gases before the gases are fed to the inner tube 7.

The start-up operation is performed by applying high pressure air to the injectors 4 of FIG. 1 and opening the valve 11 of the ignition combustion chamber 5, while at the same time supplying liquid or gaseous ignition fuel to a spreader (not shown) in the ignition combustion chamber and closing the valves 13 on the distribution box 12 and the valves for the auxiliary combustion chambers 14. Thereafter, the fuel in the combustion chamber 5 is ignited, the speed of the unloaded or lightly loaded turbine is increased, the air valves for the auxiliary combustion chambers 14 are opened and liquid or gaseous ignition fuel is supplied to the chambers 14 and is ignited for heating the fluidized bed.

It should be appreciated that in order for the auxiliary combustion chambers to uniformly and quickly heat the material of the fluidized bed to an ignition temperature, the pressure of the heated air from the chambers 14 must be sufficient to allow the air to pass through the bed and the air must be heated to a temperature sufficient to produce a corresponding ignition temperature of normally 700°–900° C.

After the bed has been heated to its ignition temperature, additional combustible material is supplied to maintain the combustion of the bed. Also, once the fluidized bed has ignited, the combustion in the chambers 5 and 14 is extinguished, the valve 11 for the chamber 5 is closed, and the valve 13 may be opened further to control the rate of combustion of the fluidized bed and, hence, the operation of the turbine under load.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A gas turbine plant, comprising:
   a gas turbine;
   compressor means operatively associated with said turbine for generating compressed air;
   starter means for rotating said compressor means during an inital starting period;
   a fluidized bed combustor connected to receive compressed air from said compressor means and to deliver high temperature products of combustion to drive said turbine during normal operation;
   auxiliary combustion chamber means connected to receive compressed air from said compressor and to provide high temperature products of combustion to said fluidized bed combustor during said initial starting period to heat the bed material thereof to an ignition temperature; and
   ignition combustion chamber means connected, in parallel with said fluidized bed combustor and said auxiliary combustion chamber means, to receive compressed air from said compressor and to provide high temperature products of combustion to drive said turbine during said initial starting period.

2. The improved gas turbine plant of claim 1 wherein said starter means includes means for injecting pressurized air into said compressor to operate said compressor and said turbine.

* * * * *